United States Patent [19]

Traino et al.

[11] Patent Number: 5,373,374
[45] Date of Patent: Dec. 13, 1994

[54] SYSTEM FOR POSITIONING MULTIPLE FILTERS IN A COLOR RASTER INPUT SCANNER

[75] Inventors: James C. Traino, Fairport; Joseph P. Taillie, Rochester; Richard C. Hogestyn, Webster, all of N.Y.

[73] Assignee: Xerox Corporation, Stamford, Conn.

[21] Appl. No.: 948,043

[22] Filed: Sep. 21, 1992

[51] Int. Cl.⁵ .............................................. H04N 1/04
[52] U.S. Cl. ................................ 358/512; 358/474; 358/505; 359/236
[58] Field of Search ............... 358/500, 501, 505, 512, 358/474, 494, 497; 359/227, 234, 236, 885

[56] References Cited

U.S. PATENT DOCUMENTS

| | | | |
|---|---|---|---|
| 3,775,006 | 11/1973 | Hartman et al. | 355/4 |
| 4,135,927 | 1/1979 | Draugelis et al. | 96/1.2 |
| 4,797,711 | 1/1989 | Sasada et al. | 355/32 |
| 4,809,062 | 2/1989 | Chen | 358/293 X |
| 4,899,214 | 2/1990 | Robbins et al. | 358/401 X |
| 4,961,118 | 10/1990 | Ueda et al. | 358/497 |

*Primary Examiner*—Bentsu Ro
*Attorney, Agent, or Firm*—R. Hutter

[57] ABSTRACT

In a raster input scanner adapted to perform multiple scans of a document through a series of color filters, a mechanism exploits the reciprocating motion of the scanner relative to the document platen to effect the changing of filters between scans without the addition of a separate motor.

10 Claims, 4 Drawing Sheets

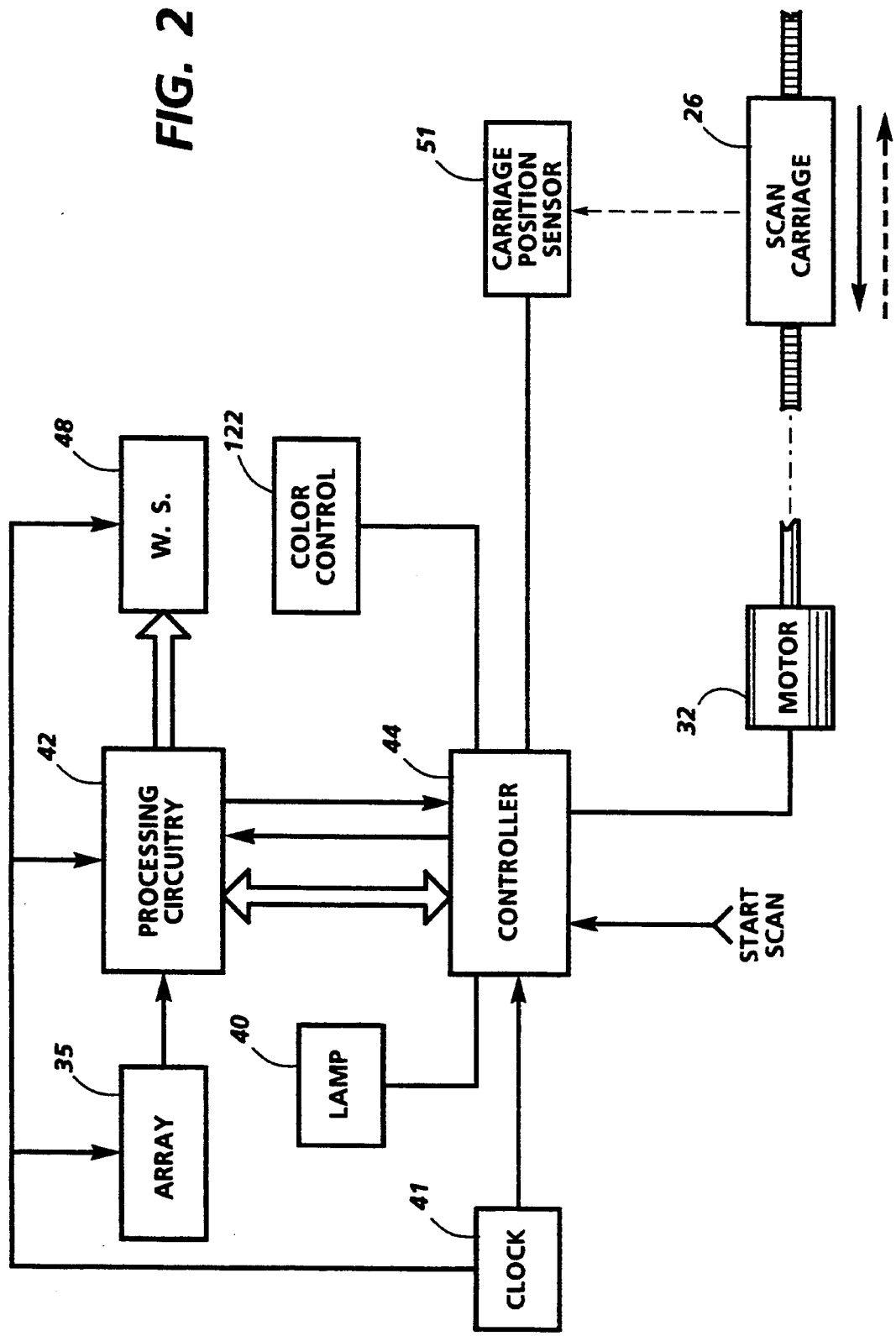

SYSTEM FOR POSITIONING MULTIPLE FILTERS IN A COLOR RASTER INPUT SCANNER

Cross-reference is made to the following patent application, incorporated herein by reference: SYSTEM FOR CONTROLLING MULTIPLE FILTERS IN A COLOR RASTER INPUT SCANNER, U.S. Patent application Ser. No. 07/947,585, filed Sept. 21, 1992, now U.S. Pat. No. 5,315,414 assigned to the assignee of the present invention and filed simultaneously herewith.

The present invention relates to a raster input scanner (RIS) for color documents, and more specifically to a system for positioning a set of color filters used in scanning color documents.

Raster input scanners typically employ one or more arrays such as charge-coupled devices (CCD's) for scanning. The array converts each scanned image line into a series of charges which, following suitable processing, are output as image signals or pixels to an end user. Scanners of this type often use a transparent platen on which the image bearing document is placed face down. The scanning array is often carried on a carriage which traverses back and forth under the platen to provide the necessary relative motion between image and array. Scanning optics focuses the array onto the image, and one or more lamps are provided to illuminate the image. Scanners of this type are disclosed, for example, in U.S. Pat. No. 4,864,415, assigned to the assignee of the present invention.

In the typical scanning process, the image area viewed by each of the array photosensors is converted into a charge potential representative of the image gray level. Scanning takes place during an integration period of preset duration. Following integration, the image charges are transferred to a pair of analog shift registers, the operating sequence being such that during the integration period, the image charges from the previously scanned line are clocked from the shift registers, leaving the shift registers free to receive the image charges from the next integration period. The duration of the integration period, which must be sufficiently long to fully integrate the image line being scanned, yet not so long as to allow the array photosensors to become saturated, is measured by periodic fixed rate clock signals.

An important variation to raster input scanners is the adaptation of such scanners for scanning multi-color images, such as color photographs. One common technique for scanning color images is to scan the original image on the platen several times, each time filtering the light reflected from the image by a filter of one color, such as red, green, or blue. Thus, the combination of three separate images filtered into primary colors can be combined by image-processing devices to reproduce the color image. In order to accomplish this sequential multiple scanning of a color image, a common technique is to provide a set of primary color filters which may be mechanically moved into place in front of a sensor array, copending on the desired color to be scanned in. Once one primary color is scanned, the filters are mechanically repositioned so that the next color in the sequence may be scanned into the sensor array. A typical arrangement of such filters may be a set of disc-shaped filters arranged on a larger rotating disc, or the filters may be in the form of elongated rectangles arranged around an axle in a "paddle-wheel" construction. By rotating the paddle-wheel about its axle, a selected one of the multiple filters may be moved into place to be interposed between the source of illumination for the image, and the sensor array. Further, it is common to employ a clear filter if it is wished to operate the scanner in monochrome mode. Generally it does not matter whether the light from the illumination means is filtered before or after it is reflected from the image.

In a raster input scanner adapted for scanning of color images, the mechanical manipulation of various filters for different portions of the color scanning process may require rather sophisticated mechanical systems for accomplishing the change of filters with each scan. To increase the amount of mechanical parts in the scanner will increase the chances of mechanical failure, particularly if the mechanical assembly for moving the filters is itself mounted on a movable scan carriage, as is common in many commercially-available scanner designs.

Various arrangements for positioning and replacing a series of color filters for scanning or xerographic copying of color images have been proposed. U.S. Pat. No. 3,775,006 and U.S. Pat. No. 4,135,927, for example, both disclose mechanical systems wherein a selected primary-color filter is disposed in a light path by activation of a selected solenoid, which causes one pivotably-mounted filter to be separated from a "rack" of filters.

One elegant solution to the problem of accomplishing both accurate control of the positions of various filters, without unduly increasing the mechanical complexity of a scanner, is to exploit the mechanical energy of the motion of the movable scan carriage for repositioning the filters between scans. Because, in the most common type of color scanner, the same image is scanned multiple times for different filters, the repositioning of the filters is typically accomplished between scanning steps.

In accordance with the present invention, there is provided, in an apparatus for scanning a color document, an image scanner converts a light image of the color document into a series of scan lines with a carriage moving the image scanner relative to the color document, wherein the improvement comprises means for optically filtering the light image, said filtering means including a positionable member and a plurality of different color optical filters mounted on the positionable member; and means, responsive to the movement of the carriage, for moving the positionable member to index the plurality of optical filters in unison with the movement of the carriage to optically filter the light image of the color document with a different color optical filter.

Further in accordance with the present invention, there is provided, in a scanner having a platen on which a color document is placed for scanning, image scanning means with an array of photosensors, each photosensor being adapted to output a response related to light focused thereon, means for illuminating an area of the platen, and means for focusing light reflected from the area on the array, the image scanning means being disposed on a carriage movable relative to the platen, a system for scanning color images, comprising: a plurality of filters, each filter corresponding to a color, disposed on a positionable member mounted on the movable carriage, and means for positioning the positionable member to operatively dispose a selected one of the plurality of filters between the illuminating means and the array, whereby light focused on the array is filtered through the selected filter. According to one embodiment of the invention, there is provided means for transferring a portion of the relative motion of the movable carriage and the platen to the positioning means, whereby motion of the movable carriage through a zone causes the positioning means to interact with a member in a fixed location relative to the platen, thereby changing the position of the positionable member.

In the drawings:

FIG. 2 is a schematic block diagram showing the principal operating elements of the scanner shown FIG. 1.

Figure 1:
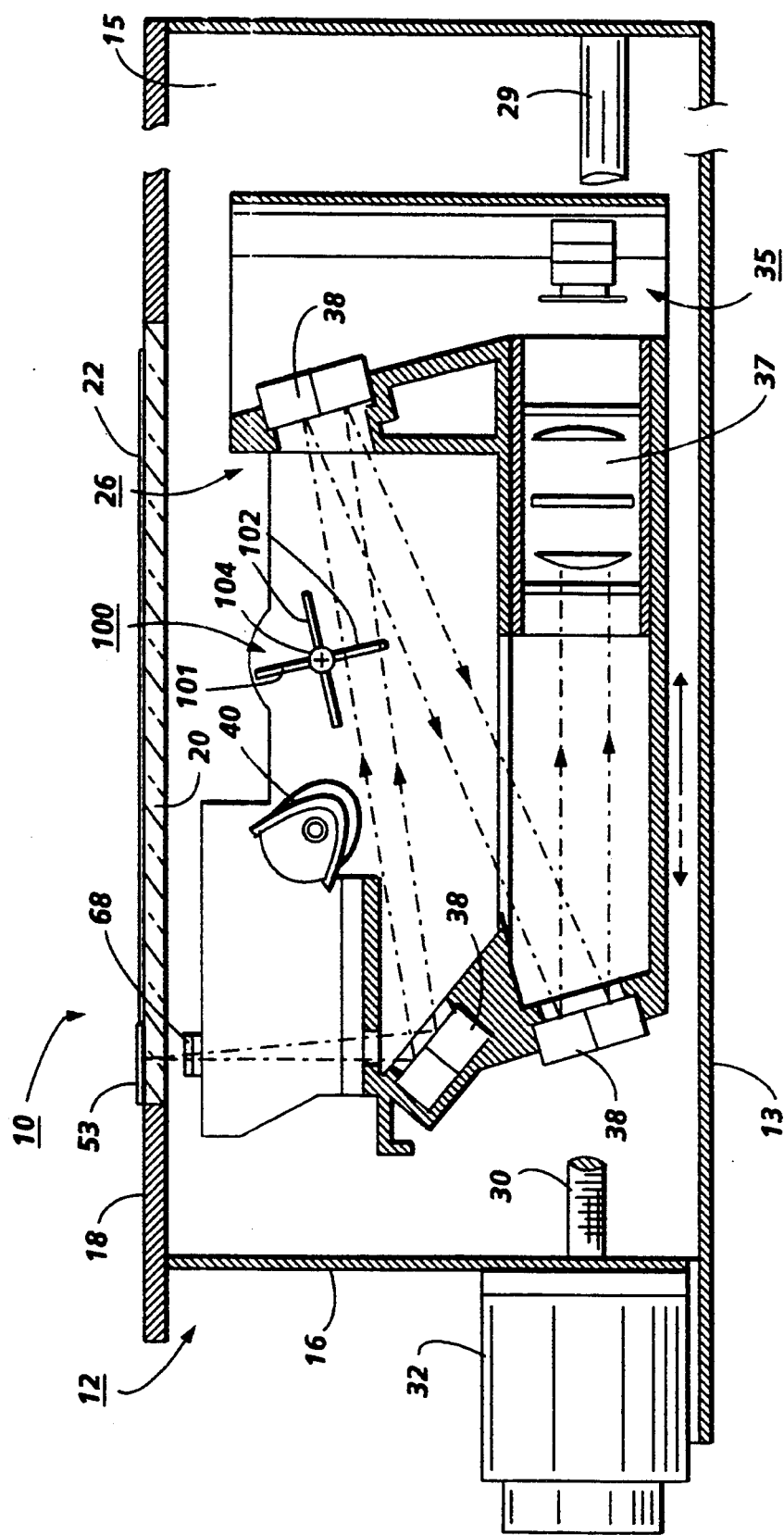
FIG. 1 is a schematic view of a raster input scanner of the type adapted to incorporate the slow scan registration self alignment system of the present invention.

Referring to FIGS. 1 and 2, there is shown an exemplary color raster input scanner, designated generally by the numeral 10, of the type adapted to incorporate the system of the present invention. Scanner 10 includes a housing 12 with base 13, sides 15, and ends 16. The too 18 of housing 12 incorporates a generally rectangular transparent platen 20. Platen 20 is formed from a relatively larger piece of transparent material, typically glass, having an opaque border delineating a generally rectangular viewing window sized to accommodate the largest document original 22 to be scanned. One corner of the border referred to as the registration corner, provides a document registration point for locating the document to be scanned on platen 20. As will be understood, a document 22 to be scanned is located either manually or by a suitable automatic document handler or feeder (not shown) on platen 20 for scanning. A scan carriage 26 is movably supported within housing 12 on base 13 for reciprocating movement in the slow scan direction underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a scan or pre-scan direction as shown by the dotted line and solid line arrows in drawing FIG. 1 respectively.

A scanning array 35 such as a CCD is suitably mounted on scan carriage 26 in predetermined operative relation with platen 20 so as to scan the document resting thereon. Array 35 is disposed so that the scan axis (designated the fast scan direction) is substantially perpendicular to the direction of movement of carriage 26 on rails 29. Suitable optical means, exemplified here by lens 37 and mirrors 38, are provided to focus a line-like area extending across the width of platen 20 and perpendicular to the direction of movement of carriage 26 onto array 35. For purposes of controlling the scanning process, the position of scan carriage 26 may be detected by a carriage position sensor (not shown). A lamp 40 is provided for illuminating the line-like area which is focused on array 35. A suitable clock 41 (shown in FIG. 2) provides clock signals for operating the system including driving array 35. The image signals generated by scanning array 35 are converted to digital form by an analog-to-digital CA/D)converter (not shown) and output to suitable image signal processing circuitry 42. Following processing, the image signals representing the document image are output to the user or workstation 48 such as a publishing workstation, personal computer, printer, etc. The coordination of the various mechanical and image-processing elements of the apparatus preferably centrally controlled by a controller 44, which may, for example, be in the form of a microprocessor. A variable rate scanning system generally similar to the type referred to above is disclosed in U.S. Pat. No. 4,748,514, incorporated by reference herein. The application incorporated by reference above and filed simultaneously herewith further describes the color embodiment of such a scanner, particularly the function of color control means 22.

Returning to FIG. 1, there can also be seen, marked generally as 100, a filter set by which a selected one of a plurality of translucent filters 102 may be interposed along the light path between the platen 20 and the sensor array 35. As shown in FIG. 1, the filter system 100 is in the form of a paddle-wheel 101 having a series of filters 102 arranged about an axle 104. In this embodiment, the filters are interposed between two of the mirrors 38, along the light path between the image and the sensor array 35. It may also be possible, in an alternate design of the scanning system, to place the selected one of the filters 102 between the lamp 40 and the image on platen 20. What is important is that the light be filtered according to the selected filter somewhere along the light path. In the embodiment shown, four filters 102 are provided, one for each of the colors blue, green, and red, plus an additional clear filter for operation in monochrome mode. In this embodiment, it is intended that each filter 102 be generally rectangular in shape approximately eight inches long along the axle 104, and approximately one-half inch wide. By rotating the paddle-wheel 101 around its axle 103, it is possible to interpose only one of the filters 102 along the light path.

Figure 3A:
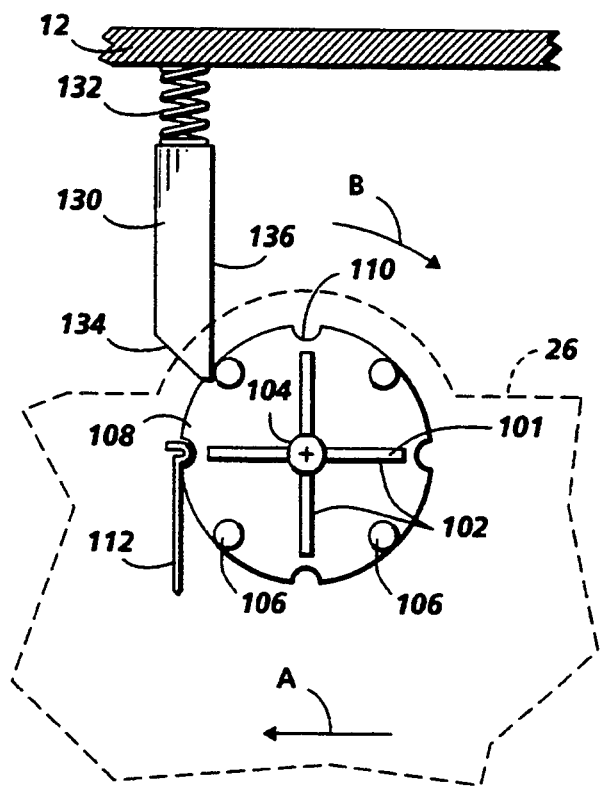
FIGS. 3a, 3b, and 3c are elevational views showing three different types of motion transfer arrangements according to the present invention.
Figure 3B:
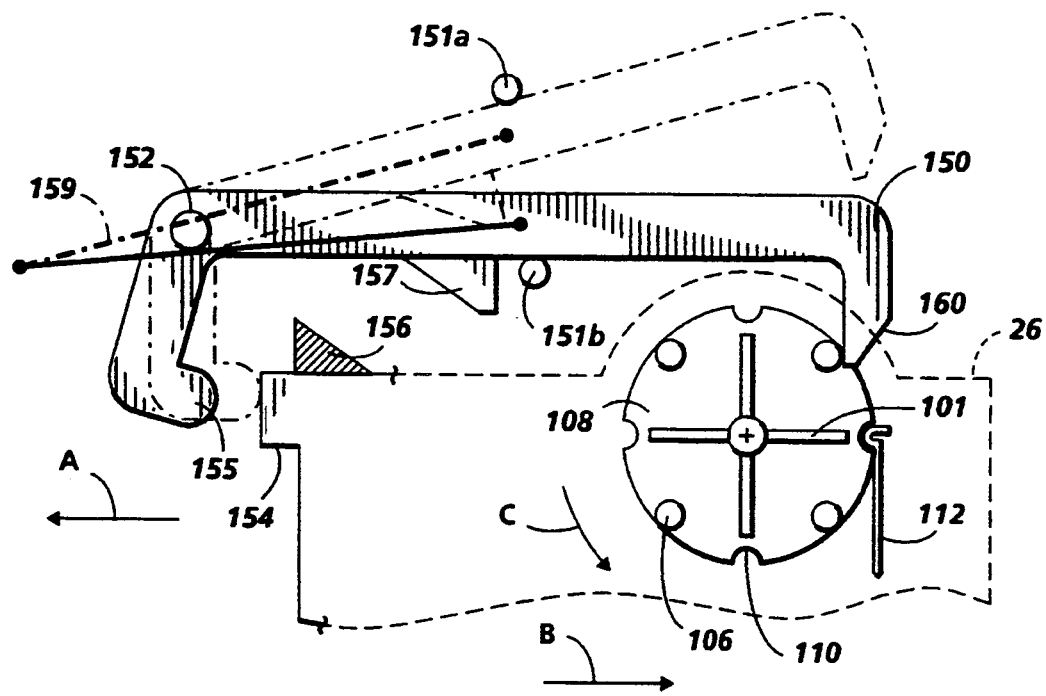
Figure 3C:
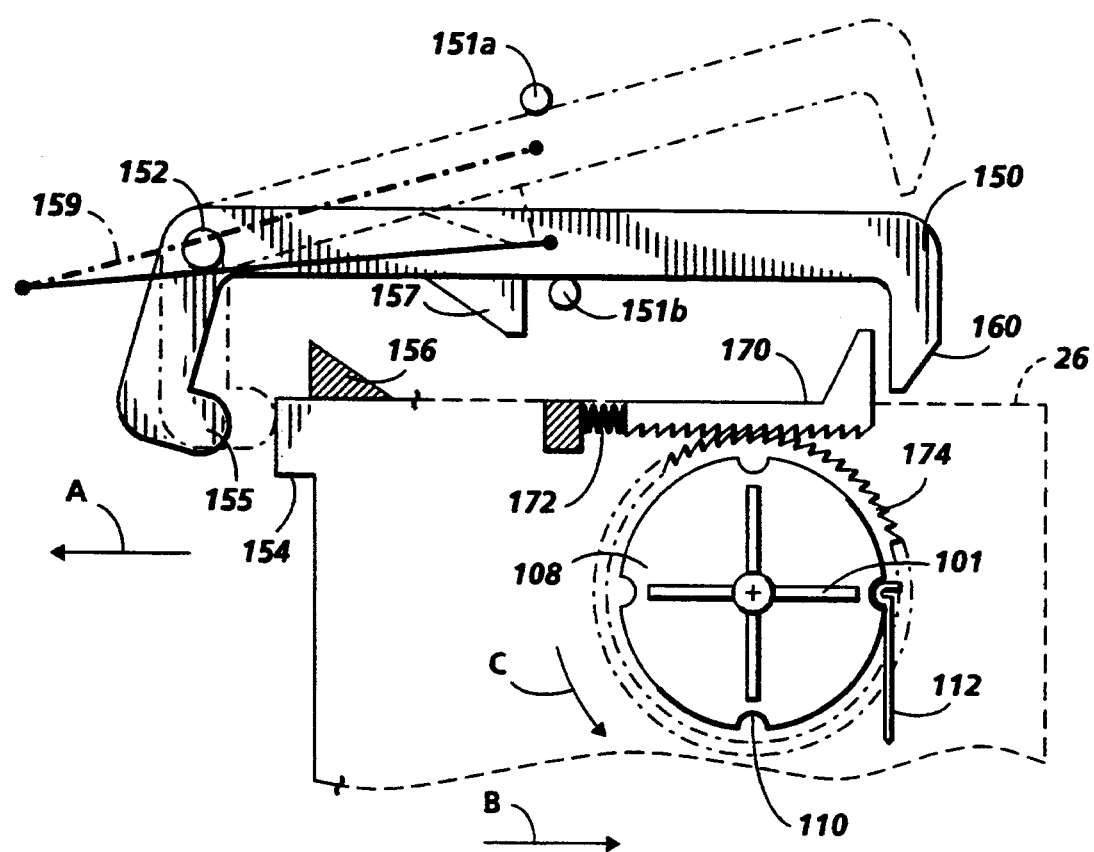

FIGS. 3A, 3B, and 3C show three different types, respectively, of motion transfer arrangements by which the motion of scan carriage 26 relative to the platen 20 and, by extension, the main portion of the scanner 10, may be exploited for movement of the paddle-wheel 101 to change filters 102 between scans. In FIG. 3A is shown a simple arrangement for causing the repositioning of the filters on the paddle-wheel 101 with each pass of the moving scan carriage 26 relative to a certain point within the scanner in direction A. As shown in FIG. 3A, the filters 102 are mounted on paddle-wheel 101, which is rotatable about an axis 104. Axis 104, is, in turn, mounted on the moving scan carriage 26, a portion of which is shown in phantom. In addition to the filters 102 forming the fins of the paddle-wheel 101, there are also provided a number of pins 106, which are in turn mounted on a wheel 108. The wheel 108 is typically mounted at one end of the elongated paddle-wheel 101, so that the pins 106 (which are pointing out of the page in FIG. 3A) will not interfere with the passage of light through any of the filters 102. On the edge of wheel 108 are further provided a plurality of notches 110, which are in turn adapted to a springable detent 112, which is also rigidly mounted to the scan carriage 26. Arranged on the top portion of the housing 12 is an actuator lever 130, which is generally urged downward by a tension spring 132. The bottom of actuator lever 130 defines a flat surface 136 and a slanted surface 134. The flat surface 132 is arranged so that, when scan carriage 26 is moving in direction A, the flat surface 136 of actuator lever 130 contacts one of the pins 106 on wheel 108, and as the scan carriage 26 continues its motion in direction A, the resultant pushing of one pin 106 against flat surface 136 will cause the paddle-wheel 101 to rotate a quarter turn. Thus, this one quarter rotation of paddle-wheel 101 will, in effect, cause a change to the position of the filters 102, so that another of the filters 102 will be interposed along the light path between the two motors 38, and, ultimately, to array 35. Thus, the motion of the scan carriage 26 in direction A past actuator 130 will cause a change in filters for the next scan.

When the scan carriage 26 is caused to move in the direction B, which is opposite direction A, as part of the next scan, one of the pins 106 will catch on the slanted edge 134 of actuator lever 130. However, because actuator lever 130 is mounted on tension spring 132, the contact between the pin 106 and the slanted surface 134 will cause not the turning back of the wheel 101 in the opposite direction, but will instead cause the actuator lever 130 to be displaced upward against tension spring 32. Therefore, only motion of the scan carriage 26 in the direction A will cause the desired quarter turn of the paddle wheel 101. The action of the springable detent spring 112 against the notches 110 in the side of the wheel 108 will ensure that the newly-place filter will be properly positioned in the light path. It will be evident that the dimensions of the pins, notches, and actuator lever are coordinated with the spring constant of the extension spring 132 and the springable detent 112 in order to accomplish this changing of filters most efficiently.

As an alternative to the embodiment shown in FIG. 3A, there may be provided, instead of the axially-displaceable actuator lever 130, a pivotably-mounted actuator lever (not shown) which is so springably mounted for displacement in one direction that the lever will distance the paddle wheel 101 when a pin 106 contacts the lever in one direction, while the lever will be pivotably displaced when a pin 106 contacts the lever in the other direction, in the same manner as the embodiment illustrated in FIG. 3A.

FIG. 3B shows an alternate mechanism for accomplishing a similar repositioning of the filters 102 on paddle-wheel 101. In FIGS. 3A, 3B, and 3C, like reference numerals indicate identical elements. In the mechanism of FIG. 3B, there is provided a pivotable lever 50 which is mounted on the housing 12 by a pivot 152. Further, on scan carriage 126 is provided a pushing bumper 154 and a lifting bumper 156. The lever 150 includes thereon a surface 155, which is arranged to contact pushing bumper 154, and an incline 157, which is arranged to slide against lifting bumper 156. Lever 150 further includes a hook 160, which is positionable to engage one of the pins 106 on wheel 108. The motion of the lever 150 may also be regulated by an over-center spring 159, attached near the center of lever 150.

It will be remembered that, in the scanning process, scan carriage 26 will move first in direction A, and then in direction B as shown in FIG. 3B. Conceivably, either direction could be the active scanning direction; what is important is that the paddle-wheel 101 having the filters thereon is caused to reposition by a quarter turn with each change in direction from A to B so that a new filter 102 will be disposed in the light path. Thus, when scan carriage 26 is caused to move in direction A, the pushing bumper 154 will contact surface 155 on lever 150, causing the lever 150 to descend from its upper position, shown in broken lines, to its active position shown in solid lines. The motion of lever 150 is limited by two stops 151a and 151b. When the bumper 154 causes the lever 150 to move down, the hook 160 at the other end of lever 150 will thus be in a position to engage one of the pins 106 as the scan carriage 126 moves in direction B. As can be seen, the motion of scan carriage 126 past the lowered hook 160 of lever 150 will cause the paddle-wheel 101 to be displaced a quarter turn in the direction shown as C to reposition a new filter in the light path. As the scan carriage moves further in direction B, however, it will be seen that lifting ramp 156 will slide against the opposite facing slanted surface of incline 157, causing the lever arm 150 to move into its upper position, shown in broken lines. Because the lever 150 ends the cycle in the upper position, hook 160 will be clear of pins 160 when the scan carriage 26 returns in direction A.

FIG. 3C is a variation of the mechanism of FIG. 38, and once again, like reference numerals indicate like elements. However, in FIG. 3C, the hook 160 of lever 150 engages not a pin 106 on wheel 108, but rather engages a gear rack 170, which in turn is mounted on a spring 172 and which engages gear teeth 174 to cause rotation of paddle-wheel 101. The gear rack 170 in spring 172 are mounted on scan carriage 126. Thus, when scan carriage 26 is caused to move in direction A, when the bumper 154 contacts surface 155 of lever 150, the lever 150 descends into its active position and hook 160 catches gear rack 170. At this point, the scan carriage changes direction from A to B, and gear rack 170 is pushed against hook 160. The continuing motion of scan carriage 26 in direction 13, causes the teeth in gear rack 170 to interact with the teeth of gear 174, and thus cause a partial rotation of paddle-wheel 101 in direction C. This rotation, once again, causes a new filter to be disposed in the light path, and, as the scan carriage 26 continues in direction B, ramp 156 interacts with lever 157 to return the lever 150 to its upper position.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. In an apparatus for scanning a color document, an image scanner converts a light image of the color document into a series of scan lines with a carriage moving the image scanner relative to the color document, wherein the improvement comprises:

means for optically filtering the light image, said filtering means including a positionable member and a plurality of different color optical filters mounted on the positionable member; and means, responsive to the movement of the carriage, for moving the positionable member to index the plurality of optical filters in unison with the movement of the carriage to optically filter the light image of the color document with a different color optical filter.

2. In a scanner having a platen on which a color document is placed for scanning, image scanning means with an array of photosensors, each photosensor being adapted to output a response related to light focused thereon, means for illuminating an area of the platen, and means for focusing light reflected from the area on the array, the image scanning means being disposed on a carriage movable relative to the platen, the improvement comprising:

a plurality of filters, each filter corresponding to a color, disposed on a positionable member mounted on the movable carriage; and means for positioning the positionable member to operatively dispose a selected one of the plurality of filters between the illuminating means and the array, whereby light focused on the array is filtered through the selected filter.

3. A scanner as in claim 2, further comprising:

means for transferring a portion of the relative motion of the movable carriage and the platen to the positioning means, whereby motion of the movable carriage through a zone causes the positioning means to interact with a member in a fixed location relative to the platen, thereby changing the position of the positionable member.

4. A scanner as in claim 2, wherein the positionable member is in the form of a rotatable paddle wheel, having a plurality of filters extending from an axle.

5. A scanner as in claim 4, wherein the rotatable paddle wheel is mounted on the carriage, and the carriage is reciprocably movable relative to the platen.

6. A scanner as in claim 4, further comprising a contact mounted in a fixed position relative to the platen, adapted to operatively contact the paddle wheel when the carriage passes therepast, thereby causing a partial rotation of the paddle wheel.

7. A scanner as in claim 6, wherein the contact is in the form of a springably-mounted actuator lever, adapted to cause partial rotation of the paddle wheel when the carriage passes relative thereto in a first direction, and adapted to be displaced when the carriage passes relative thereto in a second direction opposite the first direction.

8. A scanner as in claim 6, wherein the contact comprises a lever pivotably mounted in a fixed position relative to the platen, the lever having a first bumper positioned to cause the lever to move from a first position to a second position when contacted by the carriage moving in a first direction, the lever further having hook means for operatively contacting the paddle wheel when the carriage passes relative thereto in a second direction opposite the first direction when the hook is in the second position, thereby causing a partial rotation of the paddle wheel.

9. A scanner as in claim 8, further including a surface on the lever for causing the lever to return to the first position when the carriage moves in the second direction.

10. A scanner as in claim 8, further comprising a gear rack operatively disposed between the hook means and the paddle wheel for transference of motion from the hook means to the paddle wheel.

* * * * *